UNITED STATES PATENT OFFICE.

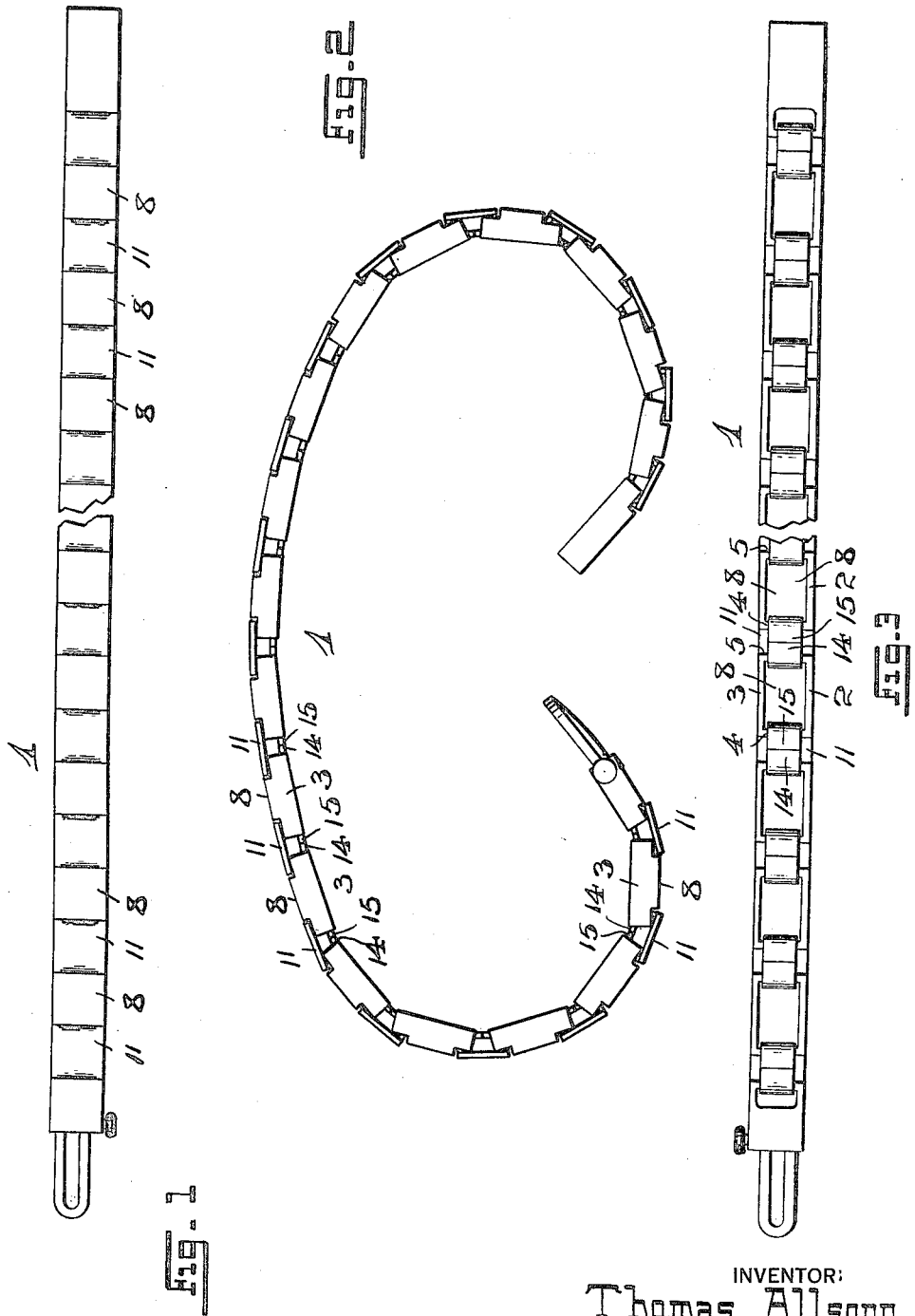

THOMAS ALLSOPP, OF NEWARK, NEW JERSEY, ASSIGNOR TO ALLSOPP & ALLSOPP, INC., A CORPORATION OF NEW JERSEY.

CHAIN ADAPTED AS LINK-BRACELET AND THE LIKE.

1,373,395.   Specification of Letters Patent.   Patented Apr. 5, 1921.

Application filed August 2, 1920. Serial No. 400,631.

*To all whom it may concern:*

Be it known that I, THOMAS ALLSOPP, a citizen of the United States, residing at Newark, in the county of Essex and State of New Jersey, have invented certain new and useful Improvements in Chains, adapted as Link-Bracelets and the Like; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in jewelry; and, the present invention has reference, more particularly, to a novel bracelet, or the like, comprising a multiplicity of hinged or pivotally connected links, with a view of providing a bracelet, or the like, the articulating members of which are connected in such a manner, that the bracelet will readily adapt itself to the wrist of the wearer, without kinking, and without producing unsightly and uncomfortable angular and sharp-edge projections, at the several points of the hinged or pivotal connection of the several links or members constituting the bracelet.

The present invention, therefore, has for its principal object to provide a novel and simply-constructed link-bracelet, or the like, the several links or members of which are connected in such a manner that the bracelet, when not in use, can be closely rolled upon itself, and will not kink; and, a further object of the present invention is to provide a bracelet which, when placed about the wrist, will readily adapt itself to the contour of the wrist, without the usual unsightly appearance, and without discomfort to the wearer.

Other objects of the present invention not at this time more particularly enumerated will be clearly understood from the following detailed description of the present invention.

With the various objects of the present invention in view, the said invention consists, primarily, in the novel link-bracelet hereinafter more particularly set forth; and the invention consists, furthermore, in the novel arrangements and combinations of the several devices and parts, as well as in the details of the construction of the said parts, all of which will be more fully described in the following specification, and then finally embodied in the clauses of the claims which are appended to and which form an essential part of the said specification.

The invention is illustrated in the accompanying drawings, in which:—

Figure 1 is a top or plan view of portions of a link-bracelet showing one embodiment of the principles of the present invention; Fig. 2 is a side elevation of the bracelet; and Fig. 3 is a bottom view of the portions of the bracelet as shown in said Fig. 1.

Figure 5:
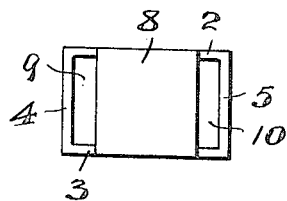
Figs. 5 and 6 are a top and bottom view respectively.
Figure 6:
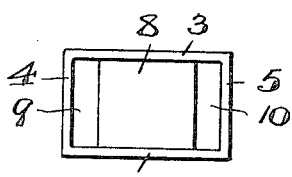
Figure 7:
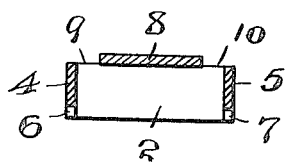
Fig. 7 is a longitudinal vertical section of one of the main links of the bracelet, said views being made on an enlarged scale.
Figure 8:
Figs. 8 and 9 are a top and bottom view respectively.
Figure 11:
Figure 12:
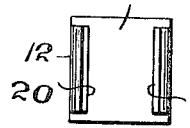
Figure 13:
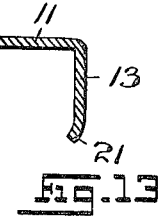
Figure 14:
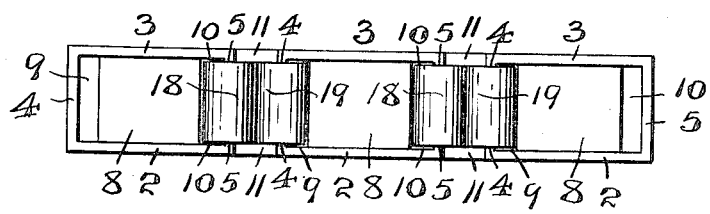
Figure 15:
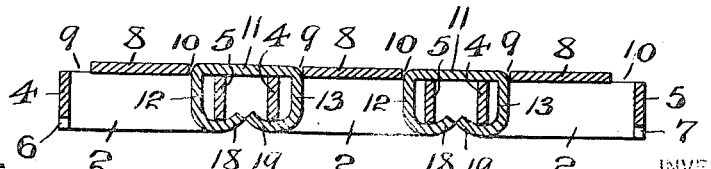

Figs. 11 and 12 are a top and bottom view, respectively, and Fig. 13 is a longitudinal vertical section of a slightly modified construction of connecting link to be used with the main links represented in said Figs. 5, 6 and 7; and Fig. 14 is a bottom view and Fig. 15 is a longitudinal vertical section of three of the said main links and the said modified forms of connecting links, represented in said Figs. 11, 12 and 13.

Similar characters of reference are employed in the said above described views, to indicate corresponding parts.

Referring now to the several figures of the drawings, and more especially to Figs. 1, 2 and 3, the reference-character 1 indicates a bracelet made up of a number of pivotally connected main links and connecting links, embodying the principles of the present invention.

As shown more particularly in Figs. 5, 6 and 7 of the drawings each main link consists essentially of a rectangularly or other suitably formed frame, comprising longitudinally extending side-members or walls 2 and 3, suitably connected by the laterally extending end-members or walls 4 and 5, said end-walls being somewhat less in width than the width of the said side-members or walls 2 and 3, so as to provide lower marginal and laterally disposed open portions or spaces, as 6 and 7, substantially as indicated in Fig. 7 of the drawings. Connected with the upper marginal edge-portions of the said side-members or walls 2 and 3 is a top-member or plate 8, said plate being narrower in the direction of the length of the frame formed by the said side-members or walls 2 and 3, and the said end-members or walls 4 and 5, so as to provide a pair of end-openings or spaces 9 and 10.

Figure 4:
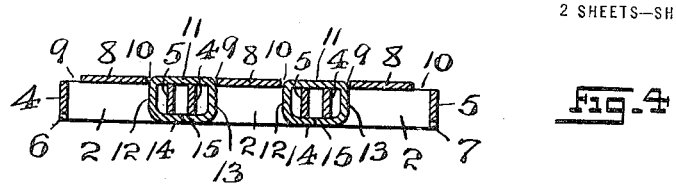
Fig. 4 is a detail vertical sectional representation of three of the pivotally connected links of the bracelet.
Figure 9:
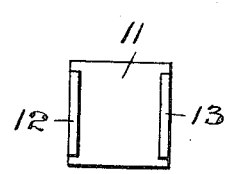
Figure 10:
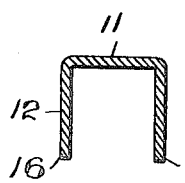
Fig. 10 is a longitudinal vertical section of one of the connecting links adapted to be pivotally connected with the main links, said views, also, being made on an enlarged scale.

Referring now to Figs. 8, 9, 10, 11, 12 and 13 of the drawings, in which is represented one of the connecting links, as shown, each connecting link consists, essentially, of a top-member or plate 11, and a pair of downwardly extending side-edge members 12 and 13, the said top-member or plate 11 usually being of the same width as the width of the above-mentioned top-member or plate 8, but the said side-edge members 12 and 13 being narrower in width, as indicated in Figs. 9 and 12 of the drawings, so that the said side-edge members 12 and 13 can, respectively, be easily passed into and through the end-openings or spaces 9 and 10 of the respective main links, as will be clearly understood. Prior to bending the lower edge-portions of the said members 12 and 13 in the manner as shown at 14 and 15 in Fig. 4 of the drawings, the lower end-portions 16 and 17 of the members 12 and 13 are in a straight or flat condition, as indicated in Fig. 10 of the drawings, or, prior to bending the lower edge-portions of the said members 12 and 13 in the manner as shown at 18 and 19 in Fig. 15, the lower end-portions of the said members 12 and 13 are slightly bent or curved in an inward direction, as at 20 and 21, substantially as indicated in Fig. 13 of the drawings.

The manner of pivotally connecting the main links, with the intermediately disposed connecting links to provide a bracelet having the various characteristics set forth in the beginning of the present specification will be readily understood from an inspection of the various Figs. 1, 2, 3, 4, 14 and 15, and any further detailed description of the same is therefore deemed unnecessary.

From an inspection of Fig. 2 of the drawings, it will be seen that the arrangement and construction of the several links, when connected, is such that the link-bracelet or chain produced can be readily rolled into the form of a small spiral; and, when placed about the wrist the bracelet or chain will easily adapt itself to the shape and coutour of the wrist, without kinking, or without otherwise producing objectionable connection between the various main and connecting links.

Of course I am aware, that some changes may be made in the general arrangements, as well as in the shapes and ornamentations of the several links, without departing from the scope of the present invention as set forth, and as illustrated in the accompanying drawings. Hence, I do not limit my present invention to the exact arrangements and combinations of the several links as described in the foregoing specification, nor do I confine myself to the exact details of the construction, nor to the general shapes and configurations of the several links, as illustrated in the accompanying drawings.

I claim:—

1. A flexible chain adapted for use as a link-bracelet, comprising a plurality of main link-members and intermediate connecting link-members, each main member consisting of a frame-like body, formed with a top-plate extending across said frame-like body and of such width so as to provide with said frame-like body receiving openings at the ends thereof, and each connecting link-member consisting of a top-plate and downwardly extending side-edge members, each side-edge member projecting downwardly into and through a receiving opening above-mentioned and having a bent portion extending about a part of the frame-like body of a main link-member, all arranged for articulated or pivotal connection of the various connecting link-members with the various main link-members.

2. A flexible chain adapted for use as a link-bracelet, comprising a plurality of main link-members and intermediate connecting link-members, each main member consisting of a pair of longitudinally extending side-members, a pair of laterally extending end-members, and a top-plate extending across said side-members and of such width so as to provide with said end-members a pair of receiving openings, and each connecting link-member consisting of a top-plate and a pair of downwardly extending side-edge members, each side-member projecting downwardly into and through a receiving opening above-mentioned and having a bent portion extending above a side-member of a main link-member, all arranged for articulated or pivotal connection of the various connecting link-members with the various main link-members.

In testimony, that I claim the invention set forth above I have hereunto set my hand this 30th day of July 1920.

THOMAS ALLSOPP.

Witnesses:
A. KIRBY,
A. GEILING.